United States Patent
Igarashi et al.

(10) Patent No.: US 7,584,047 B2
(45) Date of Patent: Sep. 1, 2009

(54) METHOD AND APPARATUS FOR DETECTING OBJECT

(75) Inventors: Yohji Igarashi, Yokohama (JP); Masaaki Sugano, Iwaki (JP); Takayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 801 days.

(21) Appl. No.: 10/869,413

(22) Filed: Jun. 16, 2004

(65) Prior Publication Data

US 2004/0267452 A1    Dec. 30, 2004

(30) Foreign Application Priority Data

Jun. 17, 2003    (JP)    .............................. 2003-171694

(51) Int. Cl.
 *G06F 21/00*    (2006.01)
(52) U.S. Cl. ...................................... 701/208; 180/167
(58) Field of Classification Search ................. 701/200, 701/213, 214, 300, 301, 208; 340/903, 905, 340/435, 436; 342/454, 455; 180/167, 168, 180/169, 170
See application file for complete search history.

(56) References Cited

U.S. PATENT DOCUMENTS

| | | | |
|---|---|---|---|
| 6,161,071 A * | 12/2000 | Shuman et al. ............... | 701/48 |
| 6,483,452 B1 | 11/2002 | Iwakini | |
| 6,487,500 B2 * | 11/2002 | Lemelson et al. ............ | 701/301 |
| 6,766,245 B2 * | 7/2004 | Padmanabhan ............. | 701/207 |
| 6,785,610 B2 * | 8/2004 | Baker et al. .................. | 701/301 |
| 7,031,496 B2 * | 4/2006 | Shimano et al. ............. | 382/104 |
| 7,084,761 B2 * | 8/2006 | Izumi et al. .................. | 340/541 |
| 2003/0069695 A1 * | 4/2003 | Imanishi et al. ............. | 701/301 |

FOREIGN PATENT DOCUMENTS

JP    10-221451    8/1998

OTHER PUBLICATIONS

JPO Office Action dated Oct. 23, 2007 on JPA No. 2003-171694 with English translation.

* cited by examiner

*Primary Examiner*—Dalena Tran
(74) *Attorney, Agent, or Firm*—Brinks Hofer Gilson & Lione (57) ABSTRACT

A method and apparatus for detecting an object on a road around a vehicle. The method includes referring to three-dimensional geographical data, calculating a distance $D_A$ to a detecting object BLD in a 360 degree range, defining an area for the detecting target by the distance $D_A$, measuring a distance $D_B$ to the object BLD and an object OBL in the 360 degree range when the vehicle travels, determining that the object is present on a road around the vehicle when $D_B < D_A$, and outputting the determination result.

11 Claims, 11 Drawing Sheets

GENERAL ROAD/RECEIVING SENSITIVITY: MEDIUM

FIG. 2B

INSIDE TUNNEL/RECEIVING SENSITIVITY: LOW

RECEIVING SENSITIVITY: NORMAL

GENERAL ROAD/RECEIVING SENSITIVITY: MEDIUM

FIG. 11B

GENERAL ROAD/RECEIVING SENSITIVITY: LOW

FIG. 11C

INSIDE TUNNEL/RECEIVING SENSITIVITY: MEDIUM

METHOD AND APPARATUS FOR DETECTING OBJECT

BACKGROUND OF THE INVENTION

1. Field of the Invention

The present invention relates to methods and apparatuses for detecting objects around vehicles, and more specifically, to a method and apparatus that are capable of accurately detecting an obstruction on a road.

2. Description of the Related Art

A radar device mounted in a vehicle, such as a millimeter-wave radar device, may be used to detect a preceding vehicle. This function may be utilized for speed control using an accelerator or a break to keep a space between vehicles in fields of an anti-lock brake system (ABS) and cruise-control techniques, and also used for steering control. Locations where such a radar device is utilized include straight roads such as freeways, on which vehicles can travel at high speed. Such radar devices are designed so that its receiving sensitivity can detect vehicles traveling ahead in the same direction and oncoming in the opposite direction and obstacles at sides of roads, such as guardrails, and signs.

Japanese Unexamined Patent Application Publication No. 10-221451 discloses a manner of determining whether an object, such as a preceding vehicle or a roadside structure, detected by a vehicle-mounted radar device is an obstruction. Specifically, a relative location of an object with reference to a vehicle is calculated on the basis of signals supplied by a vehicle-mounted radar device, an absolute location of the object based on the relative location and a current position of the vehicle is found, the absolute location is compared to location data on a roadside structure, and thereby the object is thereby determined to be or not be a roadside structure.

Figure 11A:
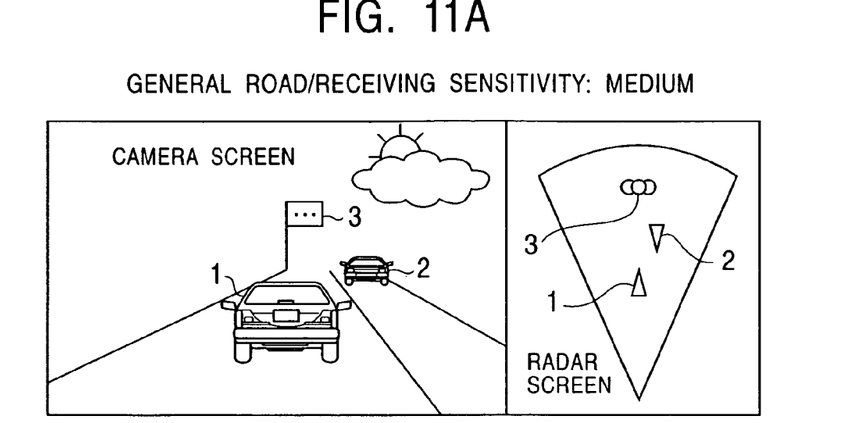
FIGS. 11A to 11C are illustrations explaining radar screens of a known radar device.
Figure 11B:
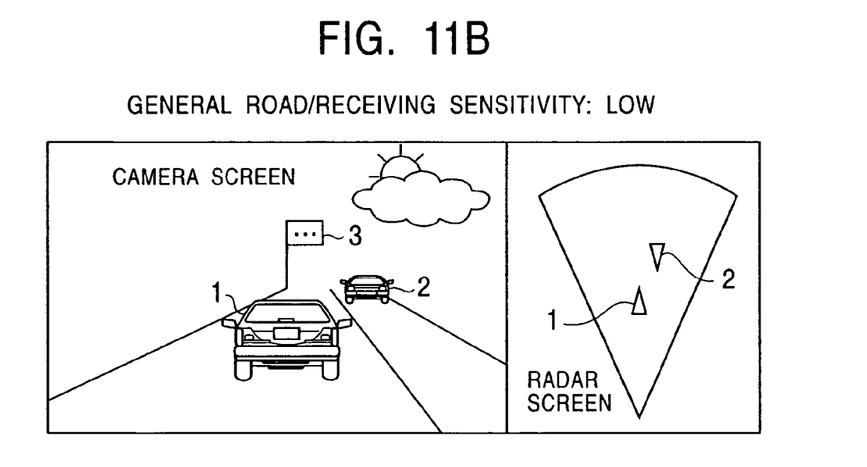

The vehicle-mounted radar devices, such as millimeter-wave radar have a fixed receiving sensitivity. Therefore, when the receiving sensitivity is set at a rather high level (a threshold of strength of received radio waves for detecting an object is set at a rather low level), as illustrated in FIG. 11A, preceding vehicles 1 and 2, a sign 3, and guardrails (not shown) can be detected and displayed on a radar screen. On the other hand, when the receiving sensitivity of the vehicle-mounted radar device is set at a rather low level, as shown in FIG. 11B, the preceding vehicles 1 and 2 can be detected, but the sign 3 and the guardrails cannot be detected. Accordingly, the receiving sensitivity of the vehicle-mounted radar device is set at a level of FIG. 11A that is sufficient for detecting the sign 3 and the guardrails.

Figure 11C:
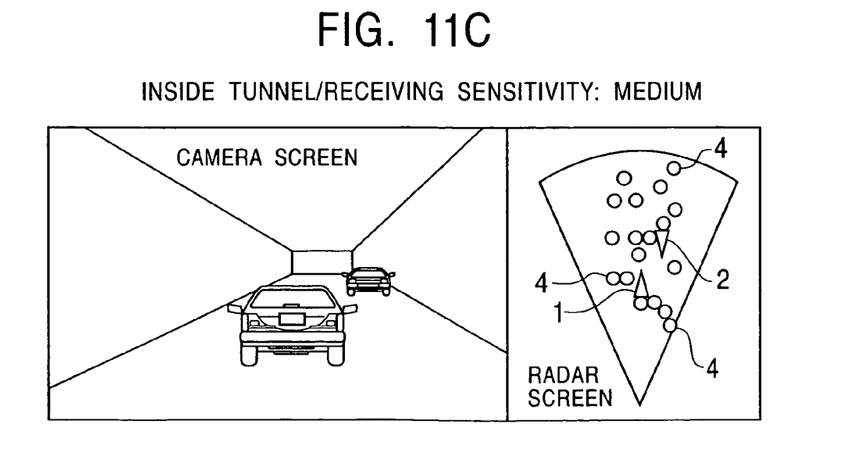

However, detecting conditions vary with surroundings; for example, as shown in FIG. 11C, when a vehicle travels on a section of a road with sound barriers, a walled-in area, such as tunnels, and a place enclosed with a steel material, such as bridges, increased radio waves reflected from the wall are picked up and output on a radar screen as noise (circles 4 on the radar screen). As a result, the detection of nearby vehicles becomes difficult.

The device of Japanese Unexamined Patent Application No. 10-221451 requires distinguishing whether a detected object is a scanning target (another vehicle) or an object not to be scanned (a roadside structure), and it is necessary to compare an absolute location with location data on the roadside structure. This comparison operation places a heavy load on the radar device, resulting in a problem in which obstructions traveling at high speed cannot be detected.

SUMMARY OF THE INVENTION

Accordingly, it is an object of the present invention to detect a target (e.g. another vehicle) accurately even when detecting conditions vary with surroundings, such as tunnels, bridges, and sound barriers.

Another object of the present invention is to detect a scanning target without distinguishing between a scanning target (e.g. another vehicle) and an object not to be scanned (a roadside structure).

A further object of the present invention is to detect a scanning target on the basis of comparison of distances.

According to a first aspect, geographical data is referred to; it is monitored whether a vehicle reaches a point to change a sensitivity of detecting an object of a radar device; the sensitivity is changed when the vehicle reaches the point to change the sensitivity; it is monitored whether the vehicle reaches a point to reset the sensitivity; the sensitivity is reset to its original level when the vehicle reaches the point to reset the sensitivity. Therefore, a target can be accurately detected, even when detecting conditions vary with surroundings, such as a tunnel, or a bridge.

According to a second aspect of the present invention, three-dimensional (3-D) geographical data is referred to; a distance $D_A$ between a position of a vehicle and a detecting target in the range of 360 degrees; and an area for the detecting target is defined by the distance $D_A$; a distance $D_B$ to an object is measured in the range of 360 degrees; it is determined that the object (e.g. another vehicle) is present on a road around the vehicle when a location corresponding to the distance $D_B$ lies in the area for the detecting target, i.e., $D_B < D_A$; and the determination result is outputted. Therefore, a scanning target can be detected without distinguishing between a scanning target (e.g. another vehicle) and an object not to be scanned (a roadside structure), and the scanning target can be detected only by comparison of distances.

Additionally, since scanning is performed on solely an area where another vehicle can be present, unnecessary scanning operations are eliminated (effective scanning is achieved).

DESCRIPTION OF THE PREFERRED EMBODIMENTS

(A) First Embodiment

Figure 1:
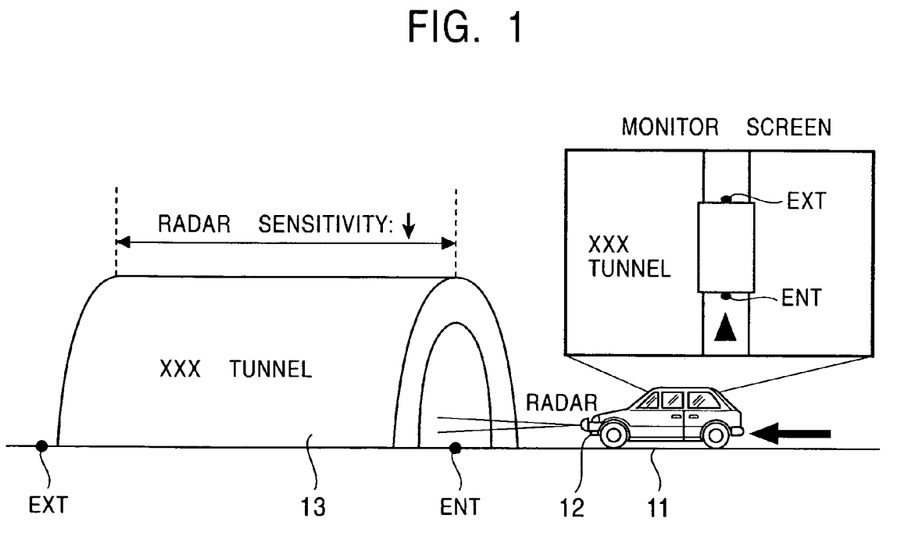
FIG. 1 is a schematic illustration of a first embodiment of the present invention.

FIG. 1 is a schematic illustration of a first embodiment. When a vehicle 11 refers to geographic data and reaches a point to change a sensitivity of detecting an object of a radar device 12, for example, it reaches an entrance ENT of a tunnel 13, the sensitivity of the radar device 12 is reduced. This results in decreased detectable noise inside the tunnel and thus facilitates detecting another vehicle to be actually detected. When the vehicle 11 reaches a point to reset the sensitivity of detecting the object of the radar device 12, for example, it reaches an exit EXT of the tunnel 13, the sensitivity is reset to its original level. Therefore, signs and guardrails, in addition to other vehicles, can be detected. The points to change/reset the sensitivity of detecting the object may be an entrance/exit of a tunnel, as mentioned above, or may be a beginning/end of a section of a road with sound barriers or those of a steel bridge, where increased noise would be picked up.

Figure 2A:
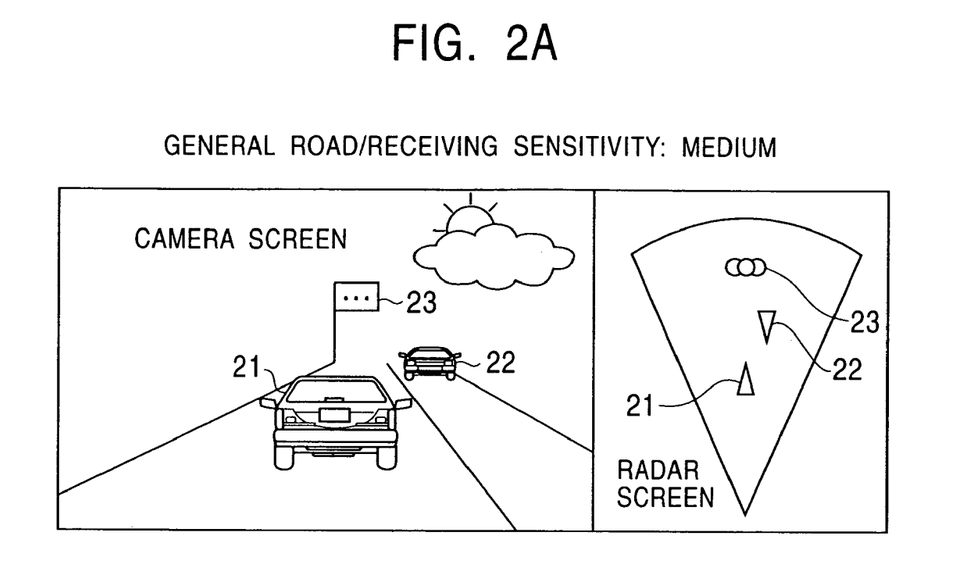
FIGS. 2A and 2B are illustrations showing radar screens according to receiving sensitivities.
Figure 2B:
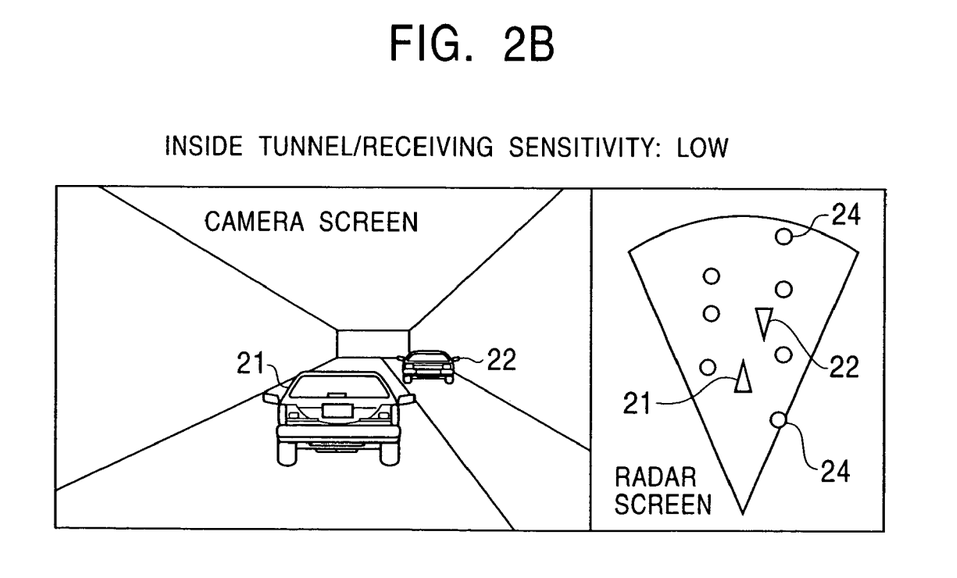

FIG. 2A shows a radar screen when the vehicle travels on a general road with a receiving sensitivity being set at a rather high level, displaying detected vehicles 21 and 22 and a detected sign 23. FIG. 2B shows a radar screen when the vehicle travels inside the tunnel with the receiving sensitivity being set at a rather low level. In this case, detected noises 24 are far less than that shown in FIG. 11C, and therefore, detecting the vehicles 21 and 22 is made easier.

Figure 3:
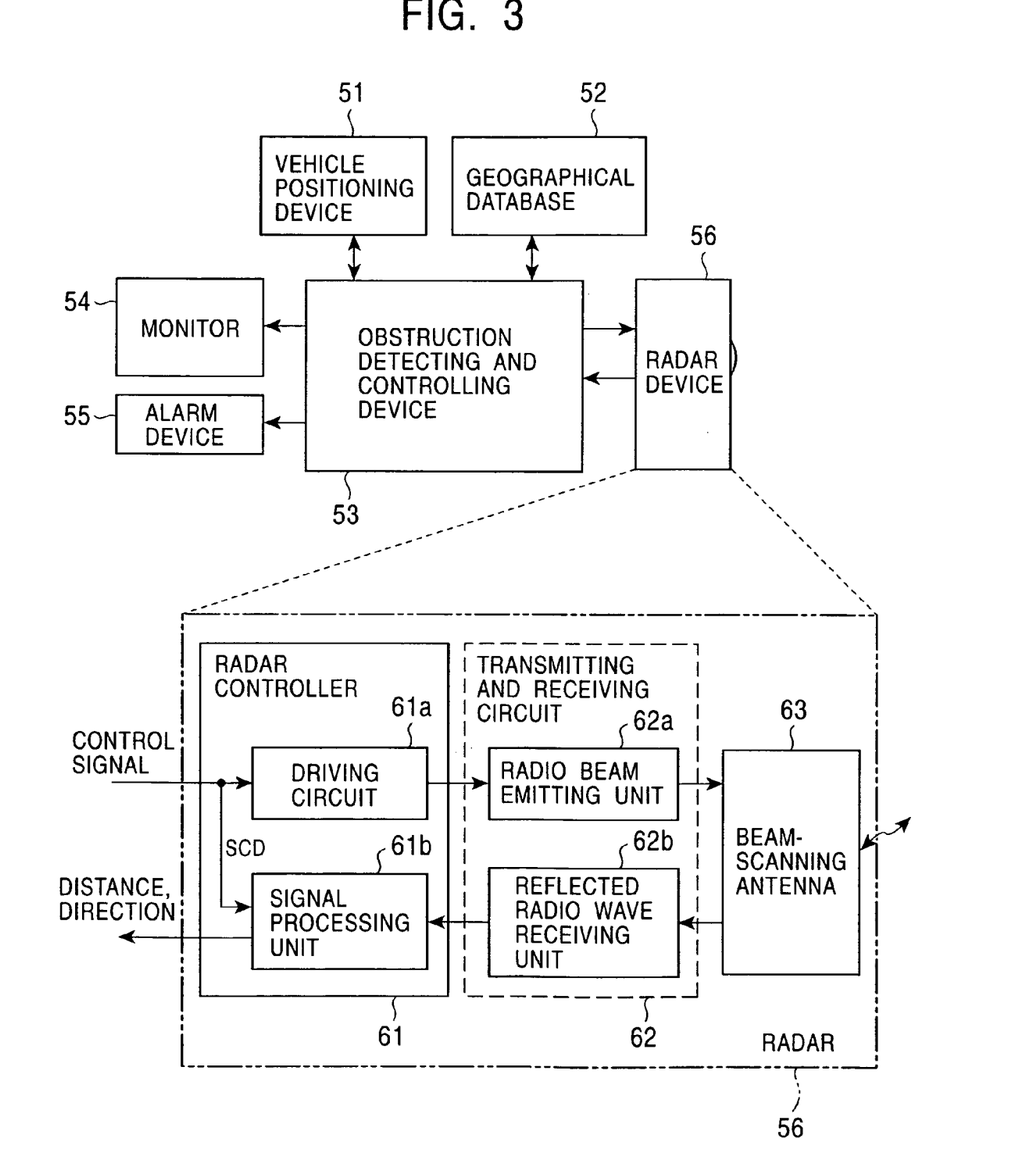
FIG. 3 is a block diagram of the first embodiment.

FIG. 3 is a block diagram of the first embodiment.

A vehicle positioning device 51 measures a position of the vehicle by means of, for example, a global positioning system (GPS). A geographical database 52 contains geographical data including information about identifiable points to decrease a sensitivity and reset it on individual roads, in addition to general geographical information. The vehicle positioning device 51 and the geographical database 52 may support a navigation system.

An obstruction detecting and controlling device 53 controls a radar device 56, acquires a distance and a direction to an obstruction, generates data for controlling display and/or audio message data, displays the data on a monitor 54 and/or raises an audio alarm by inputting the data to an alarm device 55. The obstruction detecting and controlling device 53 controls a sensitivity of the radar device 56 following a flowchart shown in FIG. 4.

The radar device 56 emits a radio beam according to instructions from the obstruction detecting and controlling device 53, scans in a direction of the beam over a range of $-\theta$ to $+\theta$, receives radio waves reflected from an object, detects a distance to the object and speed thereof in the range of $-\theta$ to $+\theta$, and inputs the detected results to the obstruction detecting and controlling device 53.

The radar device 56 may use, for example, a vehicle-mounted millimeter-wave radar module under a frequency modulated continuous wave (FMCW) system. The radar device 56 has: a radar controller 61 including a driving circuit 61a and a signal processing unit 61b; a transmitting and receiving circuit 62 including a radio beam emitting unit 62a for emitting a radio beam in response to a driving signal from the driving circuit 61a and a reflected radio-wave receiving unit 62b for receiving the radio waves reflected from the object; and a beam-scanning antenna 63 for beam-scanning over the range of $-\theta$ to $+\theta$. The signal processing unit 61b switches between threshold levels of strength of radio waves for detecting an object in accordance with a sensitivity indicated by the obstruction detecting and controlling device 53. On the basis of reflected radio-wave signals greater than or equal to the threshold, it then computes a distance and a direction to the object, and speed thereof, and inputs the results to the obstruction detecting and controlling device 53.

Figure 4:
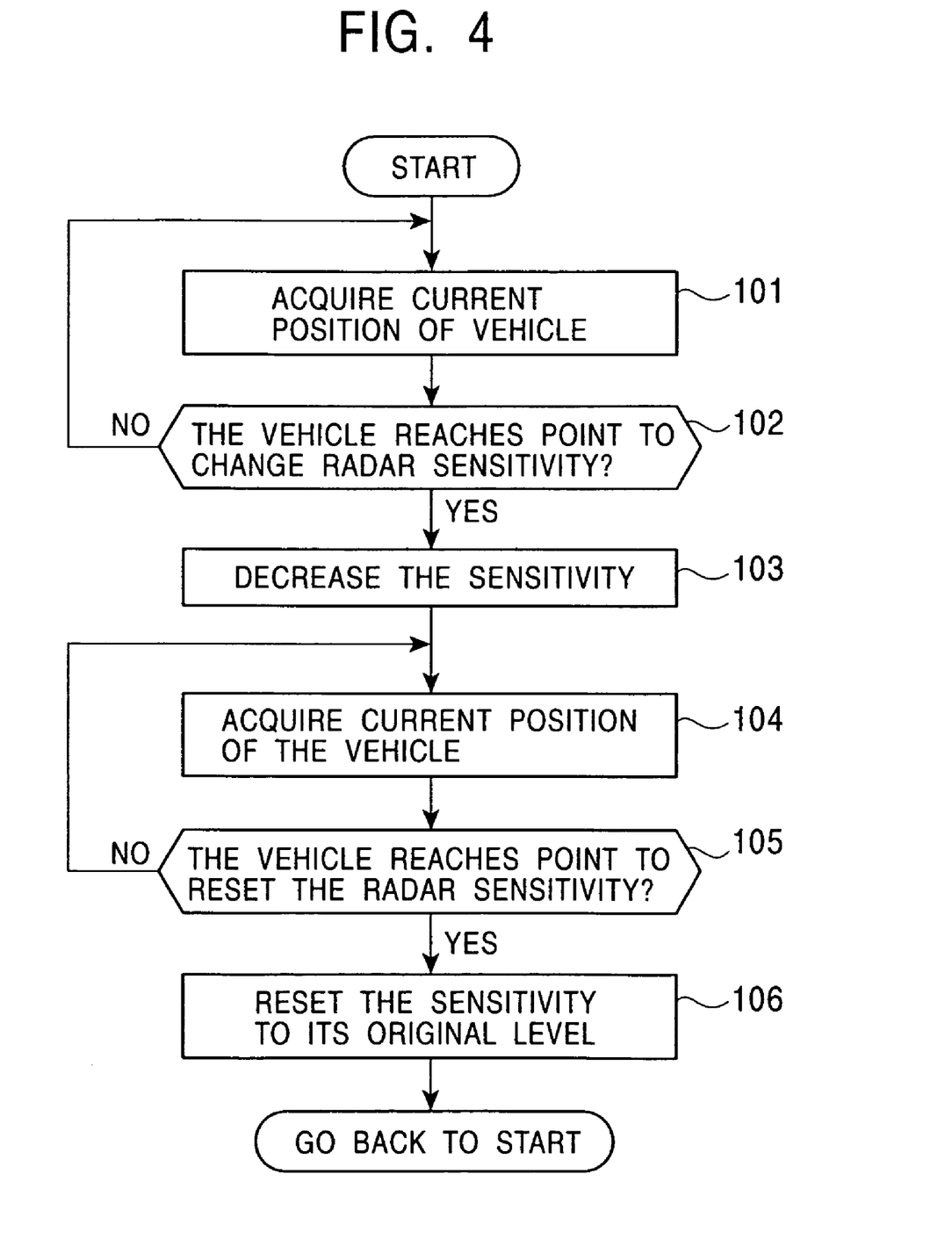
FIG. 4 is a flowchart of processing of controlling the sensitivity of the radar device of the first embodiment.

FIG. 4 is a flowchart showing a sensitivity switching performed by the obstruction detecting and controlling device 53.

The obstruction detecting and controlling device 53 acquires a position of the vehicle from the vehicle positioning device 51 (act 101), refers to geographical data, and determines whether the vehicle has reached a point to decrease a radar sensitivity (act 102). If not, processing repeats acts 101 and 102. If the vehicle has reached the point, the obstruction detecting and controlling device 53 provides the radar device 56 with instructions SCD for decreasing the sensitivity (act 103). The radar device 56 thus sets a threshold of strength of reflected radio waves for detecting an object at a higher level, thus the sensitivity is set at a rather low level.

The obstruction detecting and controlling device 53 acquires a position of the vehicle from the vehicle positioning device 51 while detecting an object under the low-level sensitivity (act 104), refers to the geographical data, and determines whether the vehicle has reached a point to reset the radar sensitivity to its original level (act 105). If not, the processing repeats acts 104 and 105. If the vehicle has reached the point, the obstruction detecting and controlling device 53 provides the radar device 56 with instructions for resetting the sensitivity to its original level (act 106). The radar device 56 thus sets the threshold of strength of reflected radio waves for detecting an object at a lower level, thus the sensitivity is set at a rather high level, and detecting objects continues under the reset sensitivity.

(B) Second Embodiment

Figure 5A:
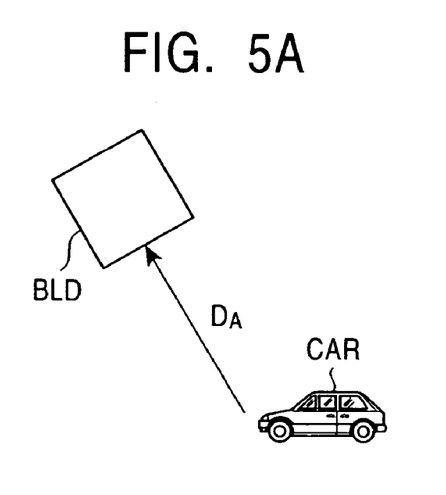
FIGS. 5A to 5C are schematic illustrations of a second embodiment.
Figure 5B:
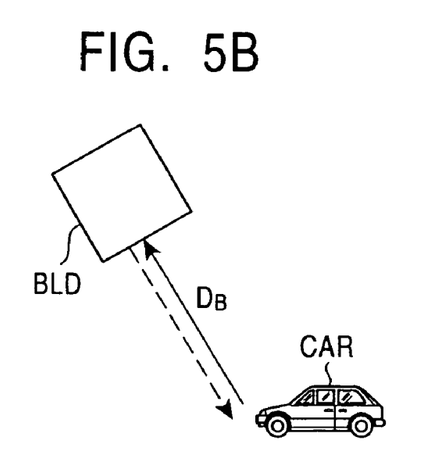
Figure 5C:
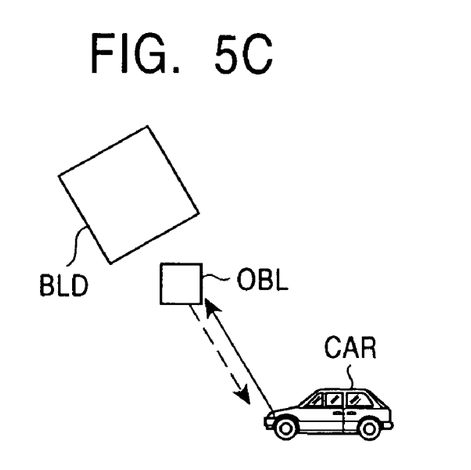

FIGS. 5A to 5C are schematic illustrations of a second embodiment.

An obstruction detecting and controlling device (not shown) of a vehicle CAR refers to 3-D geographical data and calculates a distance $D_A$ from a position of the vehicle CAR to a detecting target (a roadside building) BLD in the range of 360 degrees (see FIG. 5A), and defines an area for a detecting target by the distance $D_A$. When the vehicle travels, a distance $D_B$ to each of the object (BLD) and an object (OBL) is measured in times or distances of predetermined length, as shown in FIGS. 5B and 5C. If a location corresponding to the distance $D_B$ lies in the area for the detecting target, i.e., $D_B < D_A$, it is determined that the object is present on a road around the vehicle, and the determination result is output.

According to a first aspect, a scanning target can be detected without distinguishing between a scanning target OBL (e.g. another vehicle) and an object not to be scanned BLD (a roadside structure), and the scanning target can be detected solely by comparison of distances.

Figure 6:
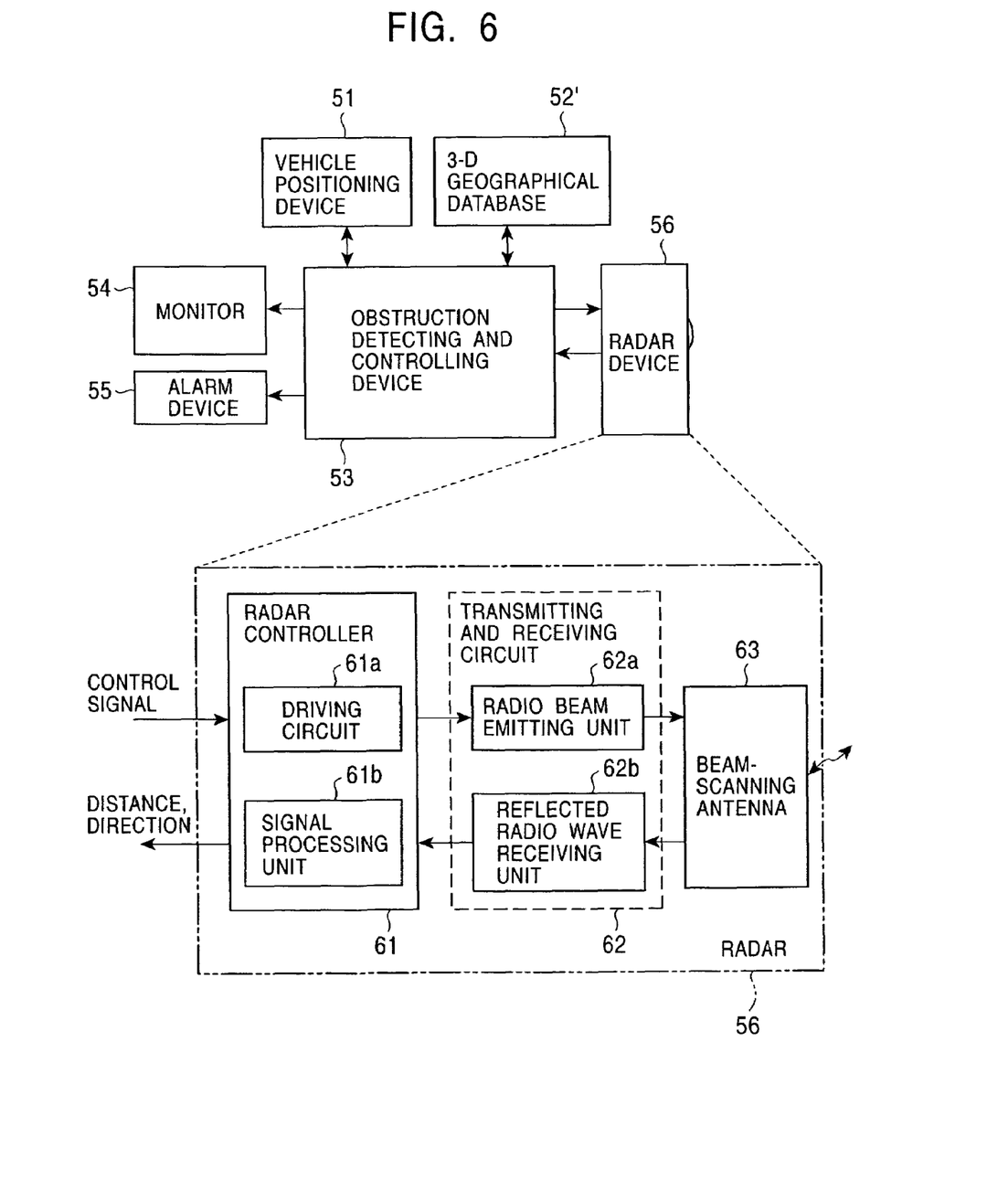
FIG. 6 is a block diagram of the second embodiment.

FIG. 6 is a block diagram of the second embodiment; in this Figure, the same reference numerals have been used as in the first embodiment (FIG. 3) for the same parts. A first difference is that the geographical database 52 has been replaced with a 3-D geographical database 52' containing 3-D geographical data. This 3-D geographical data includes plan configurations of roads, sidewalks, buildings, and the like and height information thereof, and can be used for displaying a 3-D map. A second difference is that the radar device 56 scans in the range of 360 degrees and a distance and speed can be detected.

Figure 7A:
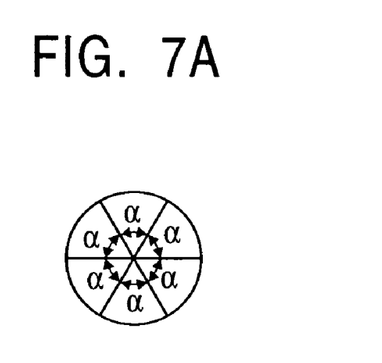
FIGS. 7A to 7C are illustrations of radar device scanning areas.
Figure 7B:
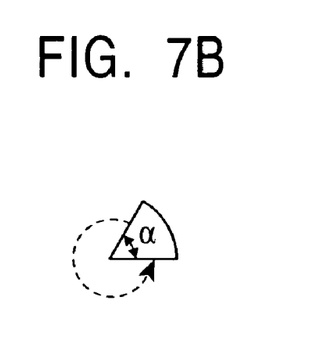
Figure 7C:
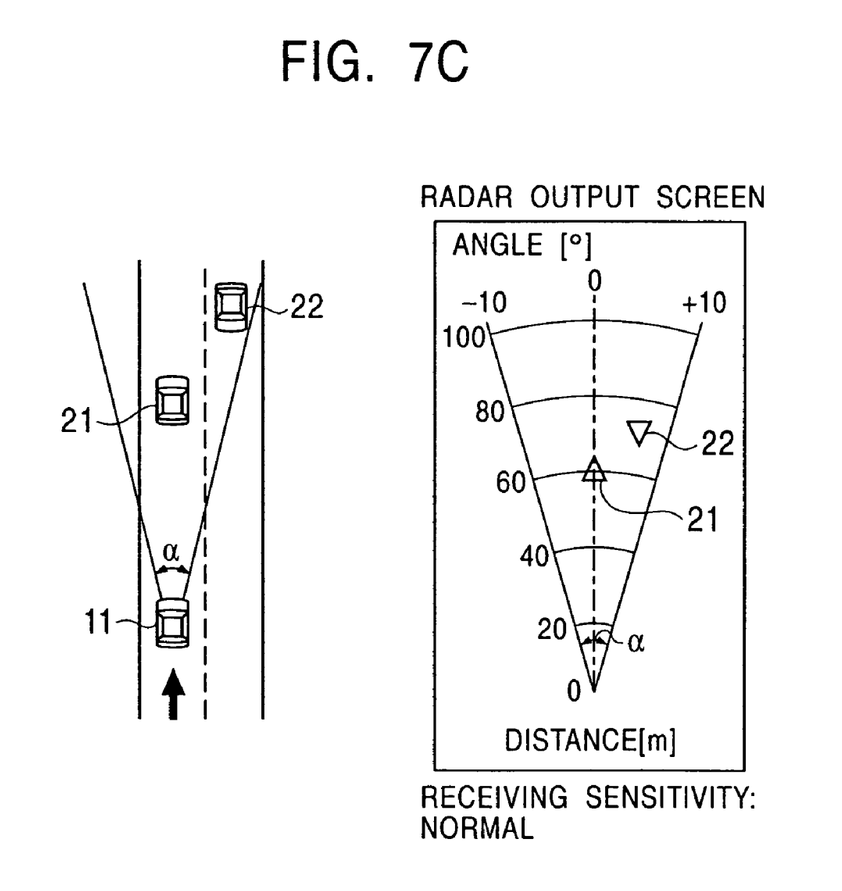

FIGS. 7A to 7C are illustrations explaining radar devices that can scan in 360 degrees: FIG. 7A shows a radar device comprising a plurality of radar device units, each of which has an α scanning area, for 360-degree scanning; and FIG. 7B shows a radar device comprising a radar device unit with an a scanning area that can rotate by a rotation mechanism for 360-degree scanning. As shown in FIG. 7C, in the radar device unit with an α scanning area, an α (−10° to +10° in the Figure) in front of the vehicle 11 is a scanning area (sensing area) and an appropriate sensitivity achieves detecting the vehicles 21 and 22.

Figure 8:
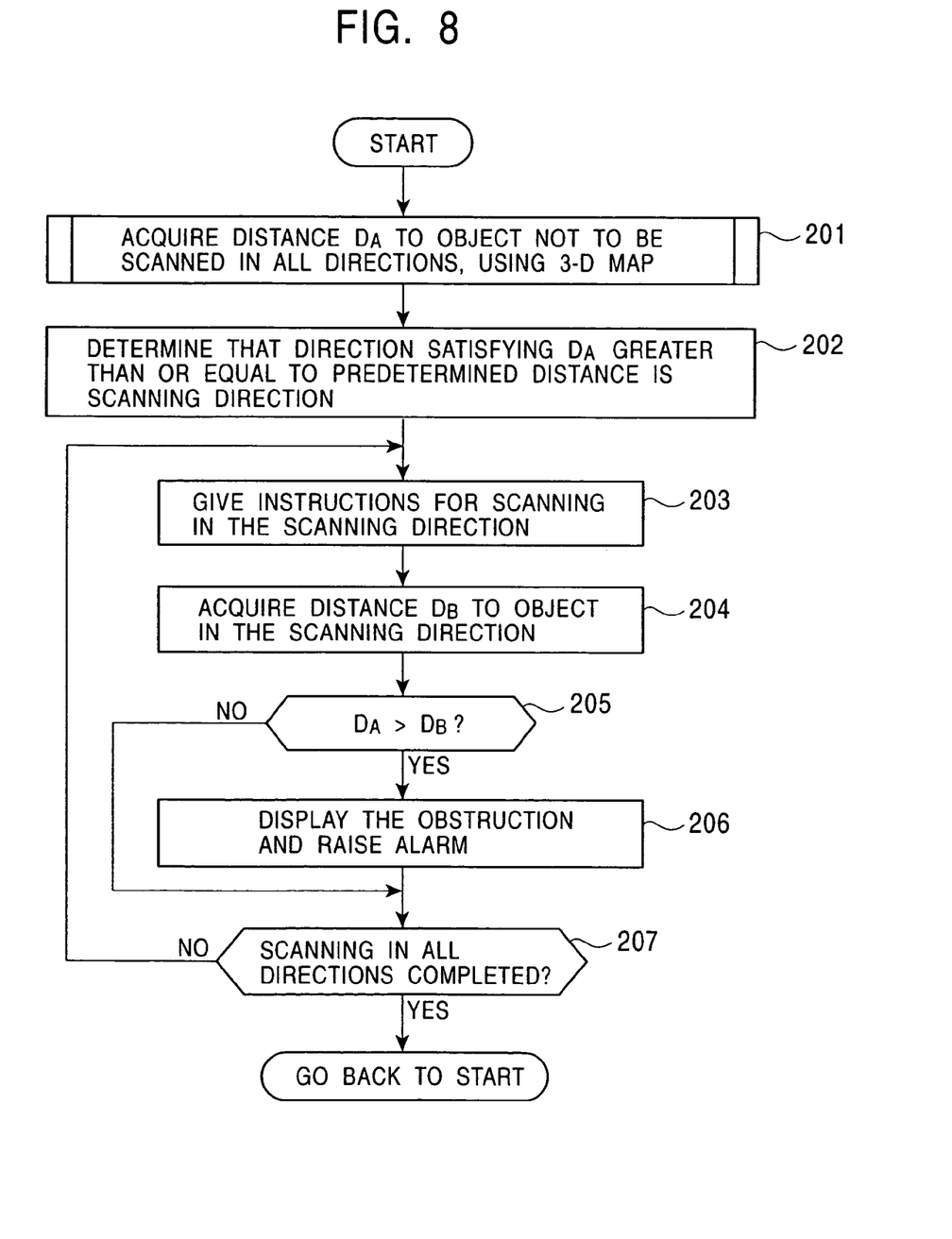
FIG. 8 is a flowchart of processing of detecting an obstruction of the second embodiment.

FIG. 8 is a flowchart of processing of detecting an obstruction of the second embodiment.

The obstruction detecting and controlling device 53 refers to 3-D geographical data and calculates a distance between a position of the vehicle and a roadside building in the range of 360 degrees, thereby defining an area for a detecting target before radar scanning (act 201).

Figure 9:
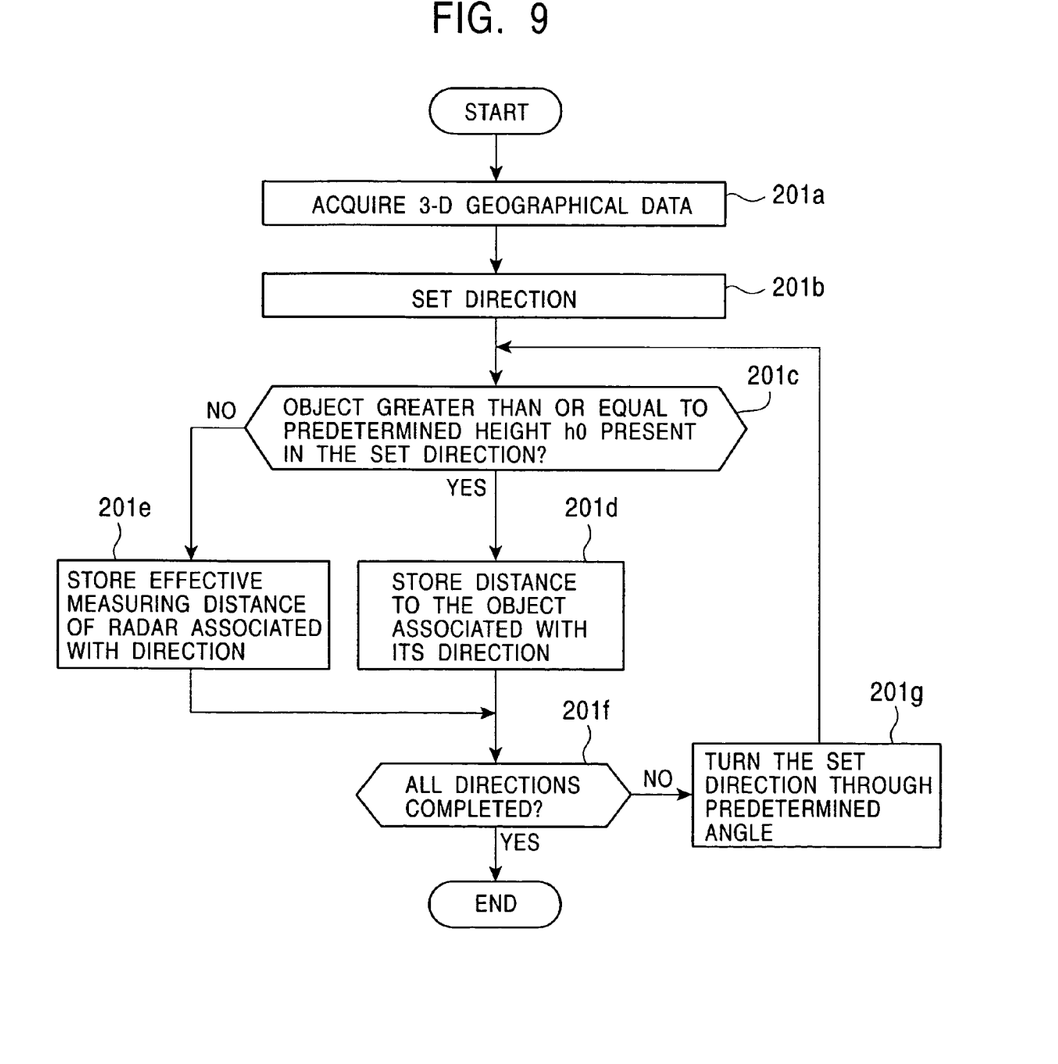
FIG. 9 is a flowchart of processing of defining an area for a detecting target.
Figure 10A:
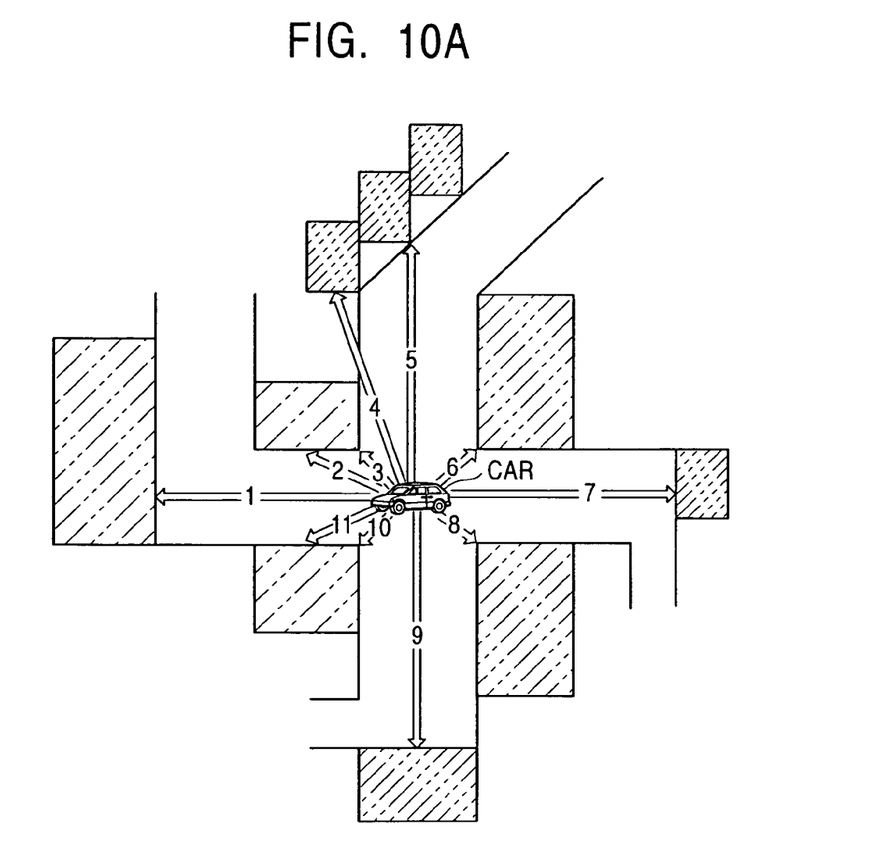
FIGS. 10A and 10B are illustrations explaining the processing of defining the area for the detecting target.
Figure 10B:
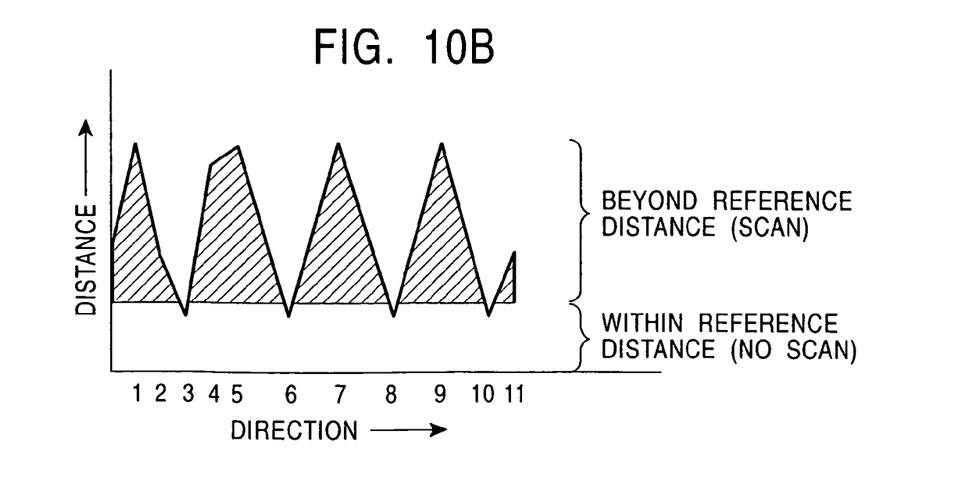

FIG. 9 is a flowchart of detailed processing of act 201. FIGS. 10A and 10B are illustrations explaining the processing of defining the area for the detecting target.

Referring to FIG. 9, in the processing of defining the area for the detecting target, the obstruction detecting and controlling device 53 acquires 3-D geographical data around the position of the vehicle from the 3-D geographical database 52' (act 201*a*) and sets an initial direction (act 201*b*). Then, it determines whether an object (a building) greater than or equal to a predetermined height h0 is present in the set direction (201*c*). The height h0 is a reference height that vehicles cannot pass over in terms of physical size, and is, for example, 50 centimeters.

With respect to a direction in which the object greater than or equal to the reference height h0 is present, it is determined that an object not to be scanned (e.g. building) is present in the direction; a distance $D_A$ to the object is recorded associated with its direction (act 201*d*). On the other hand, with respect to a direction in which the object greater than or equal to the reference height h0 is not present, an effective distance of the radar device is recorded as a distance $D_A$ associated with its direction (act 201*e*). In view of sidewalks, a distance $D_A$ is recorded after the width of a sidewalk is subtracted from it.

Then, it is determined whether a distance $D_A$ has been measured in all directions (act 201*f*); if not, a set direction is rotated a predetermined angle (act 201*g*) and processing of act 201*c* and subsequent acts is repeated.

According to the processing of defining the area for the detecting target, when buildings greater than or equal to the reference height h0 are present, which are hatched in FIG. 10A, the area for the detecting target is the area hatched in FIG. 10B. In FIG. 10B, an area within a reference distance (an area within 5 meters in consideration of sidewalks), which is the area where another vehicle cannot be present in terms of physical size, is excluded from the area for the detecting target. This is because the distance required for another vehicle lying in between the vehicle CAR and a building is 5 meters or more, considering sidewalks. However, this exclusion is optional.

Referring back to FIG. 8, when the processing of defining the area for the detecting target is completed, the obstruction detecting and controlling device 53 determines that a direction satisfying that a distance $D_A$ to an object not to be scanned is a predetermined distance (5 meters in consideration of sidewalks) or greater is a scanning direction (act 202). Since it is determined that a direction of $D_A$<5 m is not a scanning direction, no subsequent processing is performed in the direction.

Then, the obstruction detecting and controlling device 53 provides instructions for scanning (act 203), acquires a measured distance $D_B$ to an object in a scanning direction by the radar device 56 (act 204), and compares the distance $D_A$ to a roadside building in the scanning direction with the measured distance $D_B$ (act 205).

If $D_A$>$D_B$, the object is an obstruction, such as another vehicle, present on the road; the obstruction detecting and controlling device 53 displays it on the monitor 54. If the obstruction is too close, the alarm device 55 raises an audio alarm (act 206). Alternatively, the speed of the vehicle may be automatically reduced in accordance with a distance to the obstruction (another vehicle).

Then, it is determined whether scanning is completed in all directions (act 207); if not, the processing goes back to act 203, performs scanning in the next scanning direction, and repeats subsequent steps.

The 3-D geographical data may be installed in a vehicle-mounted device in advance, or only necessary sections may be provided externally via communications.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. An apparatus for detecting an object around a vehicle comprising:
    a vehicle positioning device operable to detect a vehicle position;
    a database, the database including three-dimensional geographical data;
    an area defining device operable to utilize the three-dimensional geographical data to define an area for detecting a target;
    object detecting device operable to measure a distance between a vehicle position and an object and determine whether the object is within the area defined by the area defining unit;
    an output device operable to identify if the object detecting device has detected an object within the area,
    wherein the object detecting device compares the distance between the vehicle position and the object with the distance between the vehicle position and a building.

2. The apparatus of claim 1, wherein the area defining device calculates the area for detecting a target by calculating a distance between the position of the vehicle and a building that is greater than or equal to a predetermined height.

3. The apparatus of claim 1, wherein the object detecting device scans in a 360 degree range.

4. The apparatus of claim 3, wherein the object detecting device associates a direction with the distance between the vehicle position and the object.

5. An apparatus for detecting an object around a vehicle comprising:
    a vehicle positioning device operable to detect a vehicle position;
    a database, the database including three-dimensional geographical data;
    an area defining device operable to utilize the three-dimensional geographical data to define an area for detecting a target, wherein the defined area is a portion of a total detectable area around the vehicle;
    an object detecting device operable to measure a distance between a vehicle position and an object and determine whether the object is within the area defined by the area defining unit;

an output device operable to identify if the object detecting device has detected an object within the area, wherein the area defining device calculates the area for detecting a target by calculating a distance between the position of the vehicle and a building that is greater than or equal to a predetermined height.

6. The apparatus of claim 5, wherein the object detecting device scans in a 360 degree range.

7. The apparatus of claim 6, wherein the object detecting device associates a direction with the distance between the vehicle position and the object.

8. The apparatus of claim 5, wherein the object detecting device compares the distance between the vehicle position and the object with the distance between the vehicle position and a building.

9. An apparatus for detecting an object around a vehicle comprising:

a vehicle positioning device operable to detect a vehicle position;

a database, the database including three-dimensional geographical data;

an area defining device operable to utilize the three-dimensional geographical data to define an area for detecting a target, wherein the defined area is a portion of a total detectable area around the vehicle;

an object detecting device operable to measure a distance between a vehicle position and an object and determine whether the object is within the area defined by the area defining unit;

an output device operable to identify if the object detecting device has detected an object within the area, wherein the object detecting device compares the distance between the vehicle position and the object with the distance between the vehicle position and a building.

10. The apparatus of claim 9, wherein the object detecting device scans in a 360 degree range.

11. The apparatus of claim 10, wherein the object detecting device associates a direction with the distance between the vehicle position and the object.

* * * * *

UNITED STATES PATENT AND TRADEMARK OFFICE
CERTIFICATE OF CORRECTION

PATENT NO. : 7,584,047 B2
APPLICATION NO. : 10/869413
DATED : September 1, 2009
INVENTOR(S) : Igarashi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1444 days.

Signed and Sealed this

Fourteenth Day of September, 2010

David J. Kappos
*Director of the United States Patent and Trademark Office*